United States Patent [19]

Newman et al.

[11] Patent Number: 4,717,555

[45] Date of Patent: Jan. 5, 1988

[54] ANTICAKING AND ANTIDUSTING COMPOSITION FOR AMMONIUM NITRATE

[75] Inventors: Anthony W. Newman, Fort Worth; Michael L. Bishop, North Richland Hills, both of Tex.

[73] Assignee: DeSoto, Inc., Des Plaines, Ill.

[21] Appl. No.: 823,520

[22] Filed: Jan. 29, 1986

[51] Int. Cl.$^4$ ............................................. C05C 1/02
[52] U.S. Cl. ..................................... 423/268; 252/382; 423/396
[58] Field of Search ............... 423/268, 396; 252/382, 252/384

[56] References Cited

U.S. PATENT DOCUMENTS

| | | | |
|---|---|---|---|
| 2,616,787 | 11/1952 | Whetstone | 423/268 |
| 2,720,446 | 10/1955 | Whetstone et al. | 423/268 |
| 3,230,038 | 1/1966 | Wilson | 423/268 |
| 3,310,494 | 3/1967 | Sproule et al. | 252/384 |
| 3,491,030 | 1/1970 | Fields | 252/384 |
| 3,640,697 | 2/1972 | Toops, Jr. | 423/396 |
| 3,922,332 | 11/1975 | Schenk | 423/395 |
| 4,001,378 | 1/1977 | Jasnosz | 423/268 |

FOREIGN PATENT DOCUMENTS

| | | | |
|---|---|---|---|
| 2042083 | 3/1972 | Fed. Rep. of Germany | 252/384 |
| 2818151 | 8/1979 | Fed. Rep. of Germany | 423/268 |
| 2214513 | 9/1974 | France | 252/384 |
| 742636 | 12/1955 | United Kingdom | 423/268 |

OTHER PUBLICATIONS

Kirk-Othmer, *Encyclopedia of Chemical Technology*, Third Edition, vol. 15 (1981), John Wiley & Sons, pp. 723, 724.

*Primary Examiner*—John Doll
*Assistant Examiner*—Wayne A. Langel
*Attorney, Agent, or Firm*—Dressler, Goldsmith, Shore, Sutker & Milnamow, Ltd.

[57] ABSTRACT

An aqueous liquid anticaking and antidusting composition is disclosed which comprises from 20 to 30 parts of a sodium naphthalene sulfonate, from 17 to 28 parts of an ammonium naphthalene sulfonate, and from 30 to 80 parts of water. In preferred practice, the compositions also include an alkene sulfonate containing from 6 to 26 carbon atoms as the sodium or potassium salt in an amount of from 1 to 5 parts. The compositions are neutralized with an acid, like sulfuric acid, to a pH of from about 5 to about 7.

10 Claims, No Drawings

ANTICAKING AND ANTIDUSTING COMPOSITION FOR AMMONIUM NITRATE

TECHNICAL FIELD

This invention relates to aqueous liquid compositions which can be spray applied onto granules of ammonium salts, and especially granules of ammonium nitrate, to reduce the tendency to cake on storage and to minimize fugitive dust.

BACKGROUND ART

The commonly owned U.S. Pat. No. 4,001,378 to John J. Jasnosz issued Jan. 4, 1977 discloses anticaking compositions for ammonium salt granules in which an alkene sulfonate is combined with finely divided particles selected from the class of magnesium carbonate, kieselguhr and clay. It is desired to provide aqueous liquid compositions which possess more effective anticaking properties and which minimize the dusting introduced by the finely divided particles by reducing the proportion of such particles (or by eliminating them) and by adhering the particles which are used to the granules which are treated.

It is desired to provide a sprayable liquid composition which will remain sprayable over a wide range of temperatures, including temperatures near the freezing point of water, and which will be effective when applied in small amount to minimize dusting and to reduce the caking tendencies for extended periods of time so that the coarse granular crystalline material will remain easily movable despite long term storage.

DISCLOSURE OF INVENTION

In accordance with this invention, an aqueous anticaking and antidusting composition comprises from 20 to 30 parts of a sodium napthalene sulfonate, from 17 to 28 parts of an ammonium naphthalene sulfonate, optionally from 1 to 5 parts of an alkene sulfonate which is used as the sodium or potassium salt, preferably the sodium salt, and from 30 to 80 parts of water, preferably from 40 to 60 parts of water.

These compositions are neutralized to a pH of from about 5 to about 7, usually about pH 6 by the addition of an acid, preferably sulfuric acid. Other acids which may be used are organic acids, like acetic acid, and inorganic acids, like phosphoric acid.

All parts and proportions herein are by weight, unless otherwise specified.

The liquid compositions of this invention are usually employed by being sprayed onto coarse granules of ammonium salts, and especially ammonium nitrate, which may be either of low density to contain a nitrogen content of about 33.5%, or of high density to contain a nitrogen content of about 34% to 35%. The low density grade is frequently used in explosive composition and the high density grade is used in fertilizer compositions.

The typical coarse granules are usually in the range of 1 to 5 millimeters in diameter, usually from 2 to 3 millimeters.

The sodium naphthalene sulfonate is a known anticaking agent, albeit this agent alone is not totally effective. An important finding in this invention is that this known anticaking agent becomes more effective and its effectiveness is more durable in combination with the other components which have been named. The preferred proportion of the sodium salt is from 22 to 28 parts.

The ammonium naphthalene sulfonate which enhances the effectiveness of the sodium naphthalene sulfonate is a sticky material, and it functions by increase a controlled tackiness which binds the fugitive dust. The ammonium salt, however, cannot be used in an excessive amount because this introduces excessive adhesiveness which causes the caking which it is desired to avoid. The preferred proportion of the ammonium salt is from 19 to 26 parts.

While naphthalene is the agent primarily contemplated in the sodium and ammonium salts specified, it can be replaced by the corresponding methyl derivatives therefor, for example sodium methyl naphthalene, sodium dimethyl naphthalene, sodium trimethyl naphthalene, and the corresponding ammonium salts.

The alkene sulfonates used herein are the same ones specified in said U.S. Pat. No. 4,001,378 and contain from 6 to 26 carbon atoms. The preferred alkene sulfonates are alpha olefins containing from 8 to 18 carbon atoms.

The alkene sulfonates function to extend the durability of the treatment by increasing the durability of the tackiness introduced by the combination of sulfonate salts. In the absence of the alkene sulfonate component, the action only lasts about 1½ months, but when the small amount of the alkene sulfonate component is added, the desired action is extended to last about 3 to 6 months.

The liquid compositions in this invention necessarily include water, and it is desirable to minimize the proportion of water which is used. On the other hand, a small excess of water can be tolerated, and can be used to adjust viscosity for sprayability.

The compositions of this invention are sprayed onto the granular ammonium nitrate to be protected while these granules are in motion, as for example while they are being tumbled or conveyed. The manner of spray application is itself well known and a matter of common knowledge in the field. From 0.3 to 5 pounds per ton represents a preferred teratment proportion in this invention, and best results are obtained when from 0.5 to 3 pounds per ton are applied. This represents an economical treatment which is highly effective and which introduces a minimal adulteration.

The inert particles which are sometimes introduced in anticaking and antidusting composition, as illustrated in U.S. Pat. No. 4,001,378 may be used here as well, but they are not essential and while they enhance the desired action, the proportion of their use can be much smaller than was contemplated in said patent.

The compositions of this invention are sprayable liquids which are easily pumped and which do not solidify at temperatures near the freezing point of water. The compositions are not flammable and do not form a hazardous vapor. Also, the product is not considered to be toxic.

EXAMPLE 1

A composition is made by stirring together 50 parts of a 50% aqueous sodium naphthalene sulfonate, 45 parts of a 50% aqueous ammonium naphthalene sulfonate, and 5 parts of a mixture of $C_{14-16}$ alpha olefin sodium sulfonates used as the sodium salt. This composition was neutralized to a pH of 6 by the addition of concentrated sulfuric acid (99%) and the neutralized composition was sprayed onto ammonium nitrate granules of average diameter about 1-2 millimeters. Both low density and high density ammonium nitrates were sprayed. It was found that the sprayed granules resisted caking and dusting, and these desirable properties lasted for several months.

What is claimed is:

1. An aqueous liquid anticaking and antidusting composition comprising, from 20 to 30 parts of a sodium napthalene sulfonate, from 17 to 28 parts of an ammonium naphthalene sulfonate, the naphthalene of the aforesaid sulfonates being selected from naphthalene and methyl-substituted derivatives thereof, and from 30 to 80 parts of water, said composition being neutralized with acid to a pH of from about 5 to about 7.

2. A composition as recited in claim 1 in which an alkene sulfonate containing from 6 to 26 carbon atoms is also present as the sodium or potassium salt in an amount of from 1 to 5 parts.

3. A composition as recited in claim 2 in which said composition is neutralized with sulfuric acid.

4. A composition as recited in claim 1 in which said alkene sulfonate contains from 8 to 18 carbon atoms and is used as the sodium salt.

5. A composition as recited in claim 1 in which sodium naphthalene sulfonate is used.

6. A composition as recited in claim 1 in which ammonium naphthalene sulfonate is used.

7. A composition as recited in claim 2 in which from 40 to 60 parts of water are present.

8. A composition as recited in claim 7 in which from 22 to 28 parts of said sodium napthalene sulfonate and from 19 to 26 parts of said ammonium naphthalene sulfonate are present, and said composition has a pH of about 6.

9. A method of treating ammonium salts in coarse granular form to render the said granules resistant to caking and dusting, comprising spraying on said granules from 0.3 to 5 pounds per ton of the composition of claim 1.

10. A method as recited in claim 9 in which from 0.5 to 3 pounds per ton of the composition of claim 5 are sprayed on said granules.

* * * * *